June 6, 1939. F. H. GOODING ET AL 2,161,413
ELECTRIC CABLE SYSTEM
Filed April 22, 1936
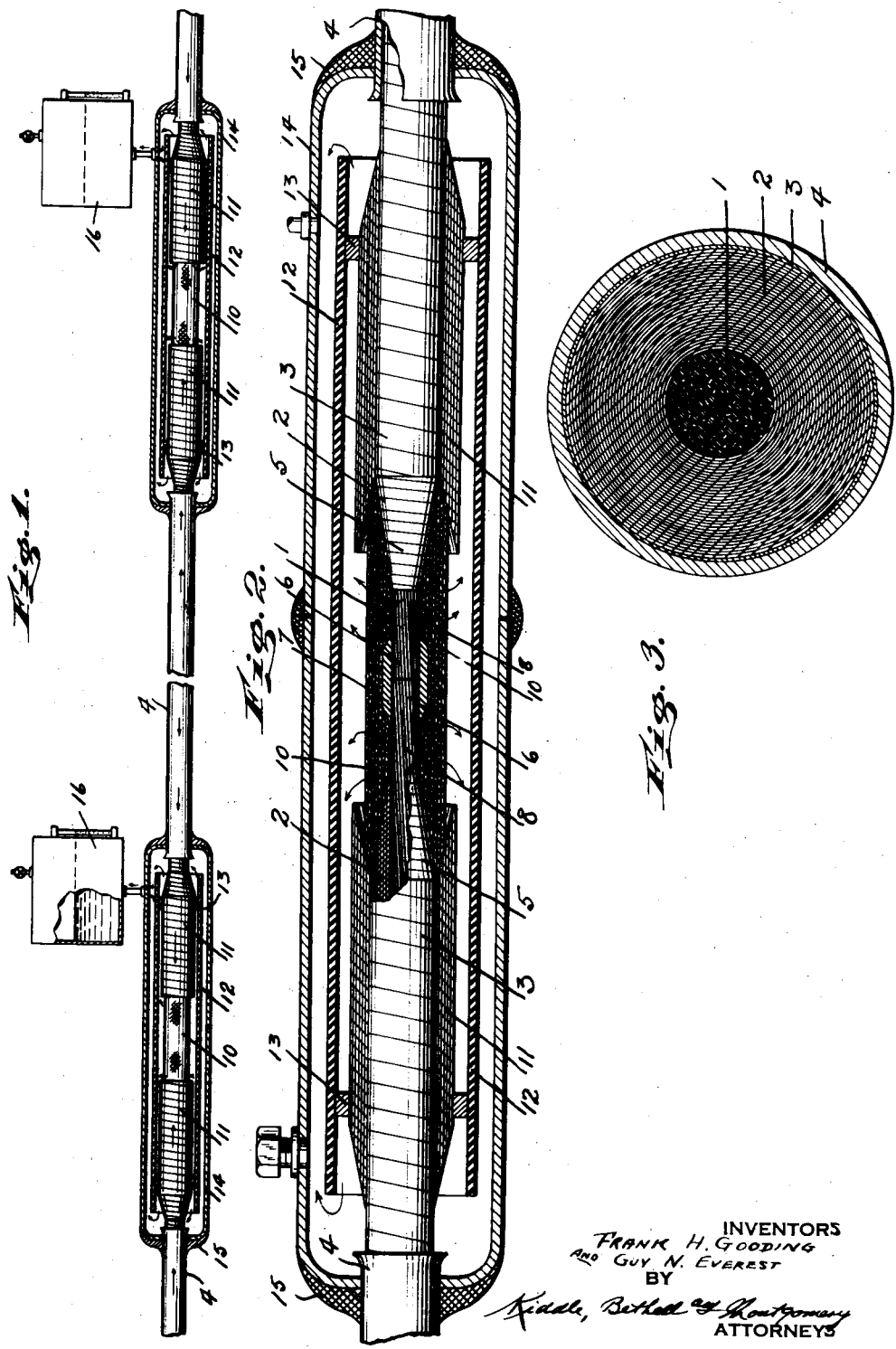
INVENTORS
FRANK H. GOODING
AND GUY N. EVEREST
BY
Kiddle, Bethell and Montgomery
ATTORNEYS Patented June 6, 1939

2,161,413

UNITED STATES PATENT OFFICE 2,161,413

ELECTRIC CABLE SYSTEM

Frank H. Gooding, Lodi, and Guy N. Everest, Hawthorne, N. J., assignors to The Okonite-Callender Cable Company, Incorporated, Paterson, N. J., a corporation of New Jersey Application April 22, 1936, Serial No. 75,690

4 Claims. (Cl. 174—21)

This invention relates to improvements in electric cable systems, and is particularly directed to solid type oil impregnated paper insulated cables, that is to say, that type in which the conductor is of the solid stranded type insulated with oil impregnated insulation such as paper, for example, and the assembly tightly enclosed in a sheath such as lead, the invention providing an electric cable system of the solid type comprising joints and reservoirs, so designed and arranged as to maintain the impregnation of the cable under varying loads and to relieve the internal pressure on the enclosing metal sheath.

In cable systems of the character indicated employing a conductor of the so-called "solid type" the cable is heated due to the passage of current. This heating causes the oil in and between the layers of the paper insulation to expand and move radially outwards, resulting in more or less permanent stretching of the outer sheath which in practice is lead or lead alloy. On cooling of the cable failure of the sheath to contract to its original condition results in the formation of voids in the spaces between the laminations of the cable insulation. These voids are ionised when high voltage is applied between the conductor and the sheath, and the resulting polymerization of the oil and emission of gas may result in the ultimate failure of the cable.

In such cable systems it has been found that cable failures originate at the conductor or the sheath, and nearly always at the conductor. For this reason it is very desirable to eliminate the formation of void spaces immediately around the conductor. Various suggestions have been made to this end. For instance, channels in the conductor have been suggested, these channels being supplied with a thin oil from reservoirs at the cable joints. This type of cable is known commercially as oil-filled cable. Owing to the use of this light oil, however, elaborate equipment must be employed in the manufacture, laying and jointing of the cable, particularly due to the fact that the oil is very fluid and readily drains out or bleeds when the outer lead sheath of the cable is cut.

In the cable system of the present invention a combination of joint and cable is used which facilitates the flow of oil from the cable into the joint reservoirs while the cable is carrying load, and back again from the joint reservoirs into the cable when the load is reduced. This transfer of oil from the cable into the reservoir while the cable is heating up builds up a pressure in the reservoir but relieves the pressure on the lead sheath, while the return of the oil into the cable on cooling, due to the pressure in the reservoir maintains oil in the spaces between the paper tapes.

It is an object of the present invention to provide a solid type cable system so constructed that, on the heating cycle of the cable, oil will flow easily out of the cable by way of the conductor, through the joint insulation, into the joint sleeve, and so into the reservoir, and on the cooling cycle will flow in the opposite direction back into the cable. This insures, as will be apparent, the presence of oil between the paper tapes adjacent the cable conductor, which is of material advantage as above pointed out, in avoiding cable failure due to the presence of voids at this area.

The oil flow between cable and joint is brought about by using a joint in which the conductor strands are exposed for a short distance on each side of the connector by which the adjacent ends of two lengths of cable conductor are united, and then wrapped with a highly porous tape through which the oil passes easily into the joint sleeve, and from there into the joint reservoir.

In such a system the oil, owing to its natural expansion when heated, moves out of the cable along the strand spaces of the conductor when the conductor is heated and travels along the conductor into the nearest joint. It then passes out through the open strand space, between the connector and the end of the cable insulation, through the tape or other permeable wrapping, and from thence into the joint reservoir. When the cable cools, the oil is forced from the reservoir by gas pressure or other suitable means in the opposite direction to that above described back into the cable conductor and into the cable dielectric.

The cable is impregnated with an oil intermediate in viscosity between the heavy cable oils commonly used for solid type cables (oil having a viscosity at 100° F. of from 2000 to 4000 seconds) and the light oils used for hollow core or oil-filled cables (oil having a viscosity at 100° F. of 100 seconds). The use of a relatively low viscosity oil is possible in the cable system of the present invention because any drainage or leakage that may be suffered during storage, transit, or jointing operations is automatically replaced with oil from the joints, due to our improved construction, when the cable is put into service. The use of the lighter oil in the system of the present invention is of advantage, as will be appreciated, in that in combination with the porous joint it reduces the resistance to oil flow between reservoir and cable to one hundredth of that found in cable systems of the type to which this invention is directed, that is, solid type cable systems.

Other objects of the present invention will be manifest from the following description and the accompanying drawing, in which drawing:

Fig. 1 is an elevational view of our improved solid type cable system partly in section;

Fig. 2 is a longitudinal sectional view of one of the joints; and

Fig. 3 is a cross sectional view of the cable proper.

Referring to the drawing in detail, 1 designates the cable conductor which is of the solid stranded type and insulated with oil impregnated paper insulation 2. Metal shielding tape 3 is wrapped about the insulation and the assembly enclosed in a lead or lead alloy, or other metal sheath 4.

The metal shielding tape may be eliminated if desired.

The insulation on the ends of adjacent cable lengths is stepped or otherwise tapered down to the conductor on each cable, as shown at 5, leaving the ends of the conductor exposed as indicated at 6. A connector 7 is brazed or soldered to the bared ends of the conductors.

Between the ends of the connector 7 and the end of the cable insulation each conductor is exposed as shown at 8, these sections being kept free of solder or brazing material. It is at this section or strand space on each side of the connector 7 that the passage of oil is permitted along the cable conductor into the outer part of the joint and vice versa as hereinafter mentioned and as indicated by the arrows in Figs. 1 and 2. The brazing or soldering of the connector 7 to the conductor ends will, in effect, as will be understood, prevent oil flow along the conductor strands at the connector.

About the adjacent ends of the cable lengths including the bare sections 8, we apply a wrapping 10 of highly porous material such as impregnated cotton tape or impregnated linen tape, as distinguished from the paper or varnished cambric generally used in solid type cable installations.

A wide roll or cylinder of oil impregnated paper 11 is slipped over the cable insulation before the two cable ends are united with the connector, and this roll is tightened down on the cable insulation by rotating the outside of the roll in the direction in which it is wrapped.

Over the whole joint we provide an insulating tube 12 of compressed paper, porcelain or other suitable material spaced from the cable by spacers 13 of wood or other suitable material.

The whole joint is encased in a metal joint sleeve 14 which is sealed to the cable sheath as shown at 15. 16 designates a reservoir communicating with the joint sleeve. The joint sleeve and reservoir contain oil, preferably the same oil as used for impregnating the cable, that is, an oil intermediate in viscosity between the heavy oils commonly used for solid type cables (viscosity from 2000 to 4000 seconds) and the light oils used for oil-filled cables (viscosity of 100 seconds). The oil is maintained under pressure by the use of gas in the reservoir which may or may not be in direct contact with the oil. Instead of gas we may employ an accumulator or other suitable pressure means.

It will be appreciated from all of the foregoing that the present invention provides a cable construction which facilitates the movement of oil from the cable into the oil reservoirs while the cable is carrying load and back again from the reservoirs into the cable when the load is reduced. It will be appreciated, furthermore, as hereinabove pointed out that this easy movement of the oil relieves the pressure on the cable sheath when the cable is under load, while the movement of the oil out of the reservoirs back into the cable, on cooling of the cable, will maintain oil in the spaces between the paper tapes constituting the cable insulation, especially immediately adjacent the cable conductor, thereby insuring the elimination of voids in the cable at the most dangerous part of the cable and reducing to a minimum the likelihood of cable failure due to these voids with resulting polymerization of the oil in the cable and emission of gas.

It is to be understood that while we have illustrated and described a single conductor cable we do not wish to be limited to the same as obviously our invention can readily be applied to multi-conductor cables. In such cases adjacent lengths of the same conductor would be jointed as described above and the whole enclosed in a single joint sleeve.

It is also to be understood that various changes and modifications may be made in the structure herein illustrated without departing from the spirit and scope of our invention.

What we claim is:

1. A solid type electric cable system comprising in combination adjacent lengths of conductor of the solid stranded type, oil impregnated insulation about said conductors, a connector for joining the adjacent ends of said conductors, said insulation terminating short of the ends of said connector to provide bare conductor spaces at each side of said connector, a wrapping of porous material about said conductors at said bare spaces and overlying the conductor insulation, a joint casing enclosing the joined ends of said conductors, said wrapping being of a material more porous than the insulation of the cable and sufficiently porous so that on expansion of the oil due to loading of the cable the oil of the cable will flow by way of said conductors and through the pores of said wrapping to said casing and in the reverse direction on cooling of the cable.

2. A solid type electric cable system comprising in combination adjacent lengths of conductor of the solid stranded type, a joint casing, the adjacent ends of said conductors being joined to each other within said casing, oil impregnated paper insulation for said conductors terminating short of the joined ends of the conductors, to provide a bare conductor space at said joint, and a wrapping of material about said bare conductor and overlying the said paper insulation, the material of said wrapping being more porous than the paper insulation of the cable and sufficiently porous so that on expansion of the oil due to loading of the cable the oil of the cable will flow by way of said conductors and the pores of said wrapping to said casing and in the reverse direction on cooling of the cable.

3. A solid type electric cable system comprising in combination adjacent lengths of conductor of the solid stranded type, a joint casing, the adjacent ends of said conductors being joined to each other within said casing, permeable insulation for said conductors terminating short of the joined ends of said conductors, a wrapping of material about the bare conductor space thus provided, said cable system being impregnated and filled with an oil having a viscosity intermediate one hundred seconds and two thousand seconds, the material of said wrapping being more porous than the conductor insulation and sufficiently porous so that on expansion of the oil due to heating of the cable the oil of the cable will flow freely to said joint casing by way of said conductors and the pores of said wrapping and in the reverse direction on cooling.

4. A solid type electric cable system comprising in combination adjacent lengths of cable conductors, insulation about said conductors, an enclosing outer sheath for each conductor length, joints for uniting the adjacent conductor ends and joints comprising a casing for uniting the sheath ends, said cable being filled with oil having a viscosity substantially midway between one hundred seconds and two thousand seconds, the resistance to movement of the oil at the joints between the conductor ends being less than in the remainder of the cable whereby on heating of the cable under load oil will be caused to flow out of the cable into the joint casing and on cooling will be caused to flow in the reverse direction.

FRANK H. GOODING.
GUY N. EVEREST.